United States Patent [19]
Byron et al.

[11] Patent Number: 5,767,440
[45] Date of Patent: Jun. 16, 1998

[54] PROTECTIVE ENCLOSURE FOR MEDIUM AND HIGH VOLTAGE CIRCUIT BREAKERS

[75] Inventors: Eldridge R. Byron, Murfreesboro; Gregory O. Motley, Smyrna, both of Tenn.

[73] Assignee: Square D Company, Palatine, Ill.

[21] Appl. No.: 570,854

[22] Filed: Dec. 12, 1995

[51] Int. Cl.⁶ .................................................. H05K 7/20
[52] U.S. Cl. ................................................... 174/17 VA
[58] Field of Search .......................... 174/17 VA, 16.2, 174/16.3; 218/155, 156, 157; 361/690–697, 676, 831

[56] References Cited

U.S. PATENT DOCUMENTS

2,927,736  4/1960  Rohatyn ..................................... 236/49
5,166,861  11/1992  Krom ........................................ 361/379
5,574,624  11/1996  Ronnie et al. ........................... 361/676

*Primary Examiner*—Kristine L. Kincaid
*Assistant Examiner*—Joseph Waks
*Attorney, Agent, or Firm*—Larry I. Golden; Kareem M. Irfan; Wayne H. Stoppelmoor

[57] ABSTRACT

The present invention provides an enclosure for housing a circuit breaker therein which utilizes a flange system to prevent enclosure components from separating from each other when an electrical fault occurs therein. The flange system includes flanges, on enclosure walls and doors, which slide into corresponding channels and interlock therein to prevent the components from separating and hot gases from escaping the enclosure when an electrical fault occurs.

14 Claims, 6 Drawing Sheets

Fig. 6
VENT EXHAUST
(NORMAL HEATING)

Fig. 7
VENT EXHAUST
(ARCING)

5,767,440

PROTECTIVE ENCLOSURE FOR MEDIUM AND HIGH VOLTAGE CIRCUIT BREAKERS

FIELD OF THE INVENTION

This invention relates generally to circuit breaker enclosures and, more specifically, to a flange system and a pressure relief system on a medium or high voltage circuit breaker enclosure to provide for protection when a high current fault occurs therein.

BACKGROUND OF THE INVENTION

Metal enclosures are used to enclose medium and high voltage circuit breakers. When a high current fault occurs in such an enclosure an arc is developed that creates hot ionized arc gasses which cause pressure to build up within the enclosure. This built-up pressure can be so great that the hot arc gasses escape from the enclosure. In fact, the pressure may become so extreme as to cause the doors and side walls of the enclosure to be blown off, and obviously has the potential to damage equipment or injure persons adjacent such enclosures. A need therefore exists to provide a circuit breaker enclosure that has components that will not separate or allow arc gasses to escape from undesired locations when a fault occurs inside the enclosure.

Some enclosures in the prior art address this problem by using several fasteners such as bolts or screws to secure top, bottom, side walls and door components of the enclosure together. This requires the enclosure components to be reinforced with or made of heavy metal to adequately support the fasteners and prevent the surrounding areas from ripping apart under high pressure conditions; a drawback to this solution is that it is costly to assemble an enclosure utilizing the heavy material and several fasteners. Furthermore, since the heavy metal is not flexible a large amount of the built-up pressure is transferred directly to the fasteners and makes the enclosure more susceptible to breaking apart under pressure when there is an electrical fault inside the enclosure. An additional disadvantage of such approaches is that gaskets are required for preventing the arc gasses from being expelled from undesired areas of the enclosure, such as where the enclosure components are joined together.

Some existing enclosures provide venting systems disposed at the top of the enclosure to vent out the arc gasses and relieve the pressure build up. However, a disadvantage of such venting systems is that they are designed for indoor use and the externally disposed vents can not be used in an outdoor environment due to the possibility of exposure of the enclosure interior to weather conditions, such as rain and snow.

Accordingly, there is a need for an improved enclosure for housing a medium or high voltage circuit breaker which avoids the shortcomings of existing systems and is capable of better protecting the enclosure and adjacent personnel when gas pressure builds up due to an arcing fault.

According to the present invention a novel flange system is provided for a circuit breaker enclosure whereby the flange system prevents the enclosure from coming apart during an electrical fault. The flange system is supplemented with a weatherproof venting system for expelling arc gas pressure and hot ionized gasses that develop during the faulted condition.

SUMMARY OF THE INVENTION

It is a general object of the present invention to provide a circuit breaker enclosure capable of better protecting adjacent personnel and equipment when a fault occurs and causes pressure to build up inside the enclosure.

It is a more specific object of the present invention to provide a circuit breaker enclosure arrangement which includes a weatherproof venting system and does not blow apart upon a fault occurring within a circuit breaker enclosure.

The present invention provides an enclosure for housing a circuit breaker therein which utilizes a flange system to prevent enclosure components from separating from each other when an electrical fault occurs therein. The flange system includes flanges, on enclosure walls and doors, which slide into corresponding channels and interlock therein to create a seal during the fault. This seal prevents the components from separating and prevents hot arc gases from being expelled from undesired locations thereby preventing damage to equipment, or individuals, adjacent the enclosure. The cooperation between the flanges and channels also prevent external elements from entering the enclosure.

The above summary of the present invention is not intended to represent each embodiment, or every aspect of the present invention. This is the purpose of the figures and the detailed description which follows.

BRIEF DESCRIPTION OF THE DRAWINGS

Other objects and advantages of the invention will be apparent from the following detailed description and the accompanying drawing in which.

While the invention is susceptible to various modifications and alternative forms, a specific embodiment thereof has been shown by way of example in the drawing and will be described in detail. It should be understood, however, that it is not intended to limit the invention to the particular form described, but on the contrary, the invention is to cover all modifications, equivalents, and alternatives falling within the spirit and scope of the invention as defined by the appended claims.

DETAILED DESCRIPTION OF THE PREFERRED EMBODIMENTS

Figure 1:
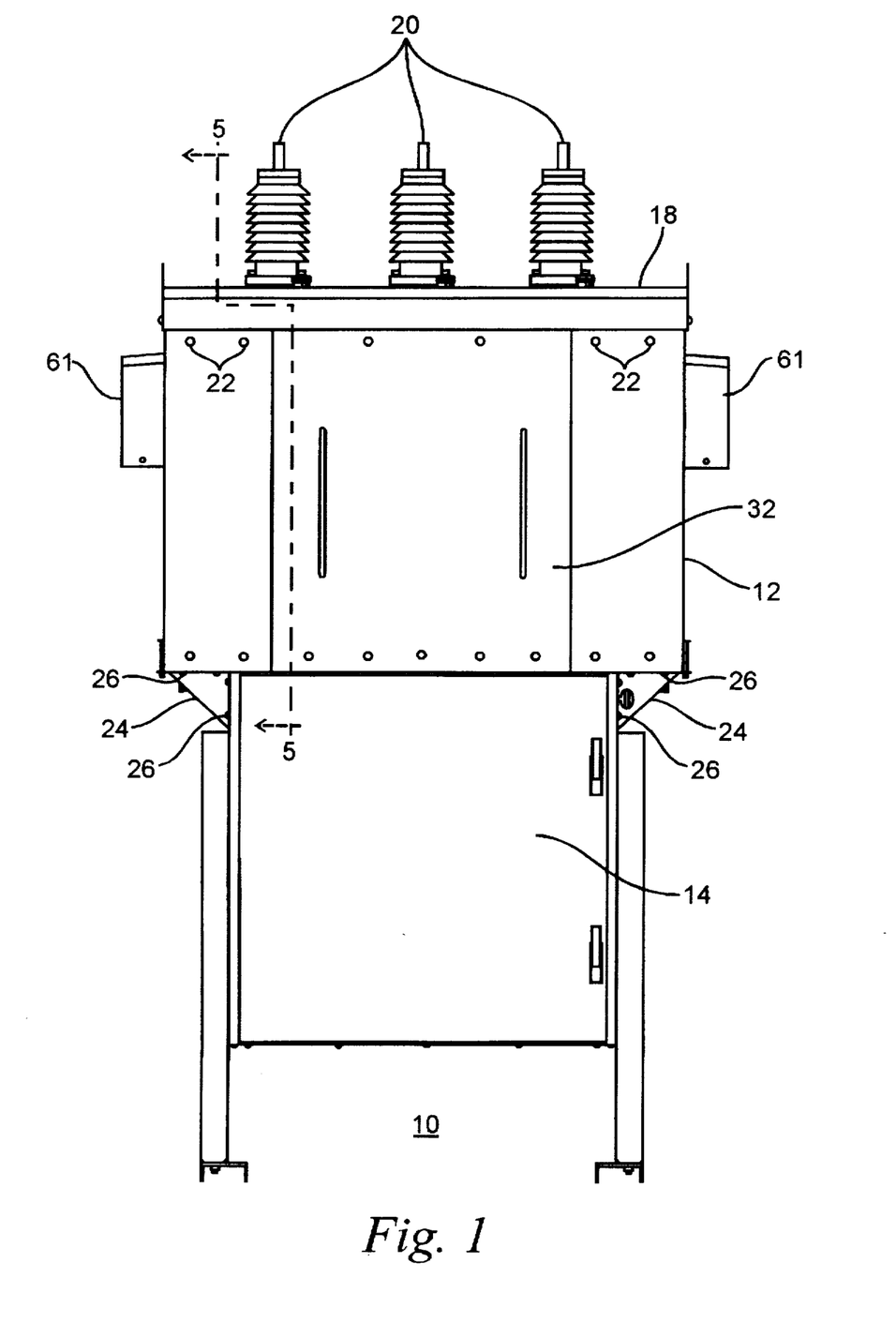
FIG. 1 is a front elevation view of a circuit breaker enclosure according to a preferred embodiment of the present invention.
Figure 2:
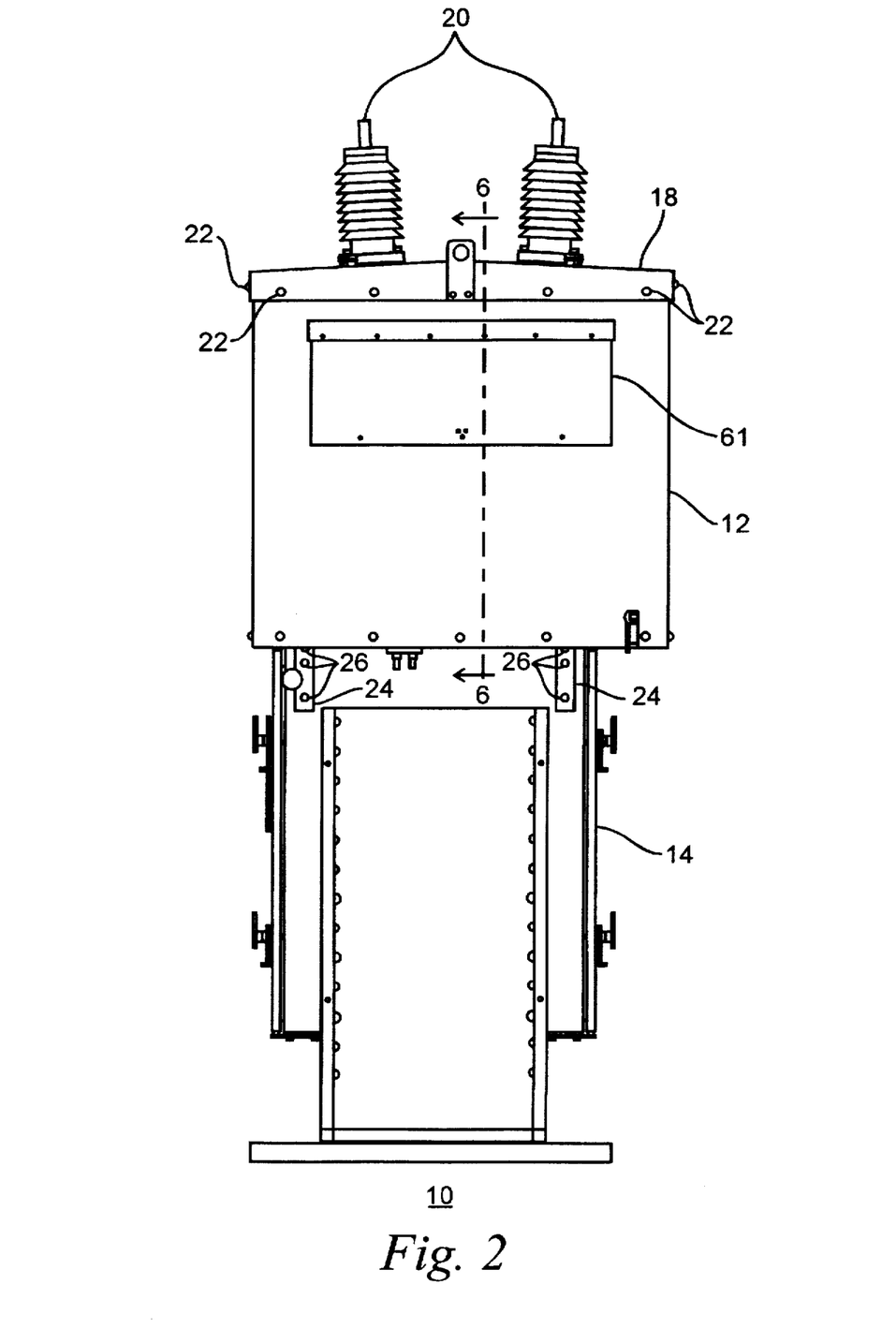
FIG. 2 is a side elevation view of the circuit breaker enclosure shown in FIG. 1.

FIGS. 1 & 2 show an enclosure 10 having a high voltage compartment 12 for enclosing medium or high voltage circuit breakers (not shown) secured to a low voltage compartment 14 for enclosing low voltage controls and wiring. The enclosure 10 also includes a roof panel 18 secured to the high voltage compartment 12 and electrical terminals 20 disposed on the roof panel 18. The roof panel 18 is a one piece welded part that is bolted onto the top of the high voltage compartment 12 with conventional bolts 22. The high voltage compartment 12 is secured onto the low voltage compartment 14 using brackets 24. The brackets 24 are secured to both the high voltage compartment 12 and the low voltage compartment 14 using conventional bolts 26.

Occasionally an electrical fault occurs within the high voltage compartment 12 which causes an electrical arc to be generated. The electrical arc generates a pressure shock wave and hot ionized arc gasses. The shock wave and arc gasses cause pressure to build up in the high voltage compartment. In conventional enclosures, the pressure caused the high voltage compartment to be blown apart. This problem is solved by the present invention by a novel flange system, disposed on side walls of the high voltage compartment, which incorporates flanges that cooperate with corresponding channels. During a fault the side walls expand outwardly, to accommodate the pressure build up, and cooperate with the channels to prevent the side walls from separating and to maintain a seal which prevents arc gasses from escaping in an undesired way. The flange system is supplemented with a weatherproof vent system to relief the pressure by controllably directing the gasses out of the high voltage compartment.

Figure 3:
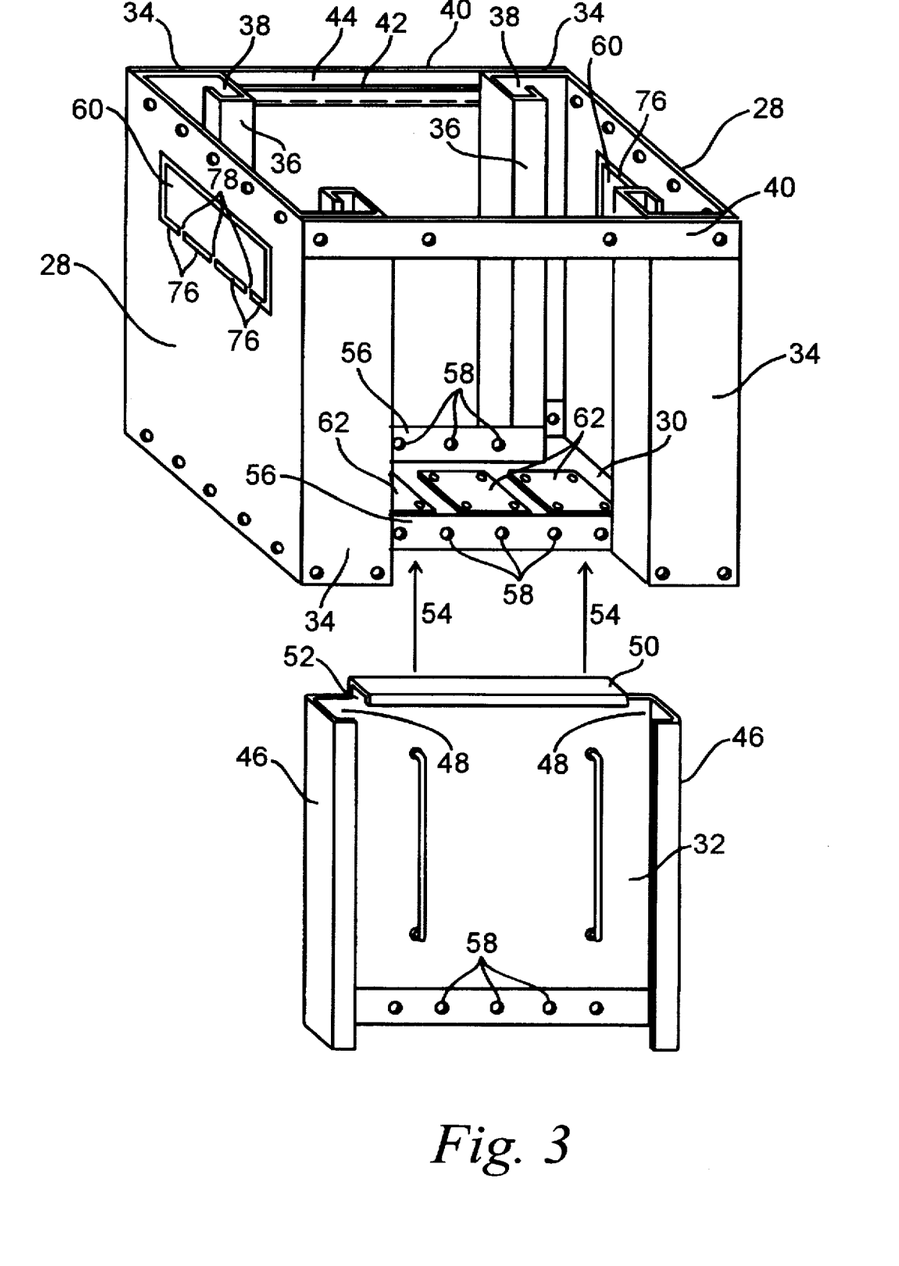
FIG. 3 is an isometric view of a high voltage compartment of the circuit breaker enclosure shown in FIG. 1.
Figure 4:
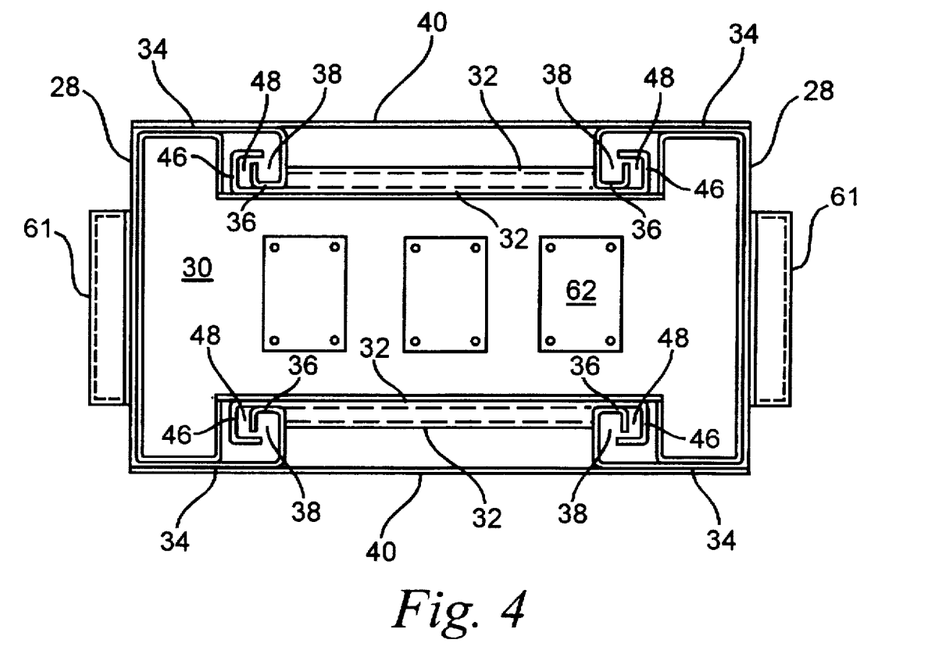
FIG. 4 is a top view of the high voltage compartment shown in FIG. 3.
Figure 5:
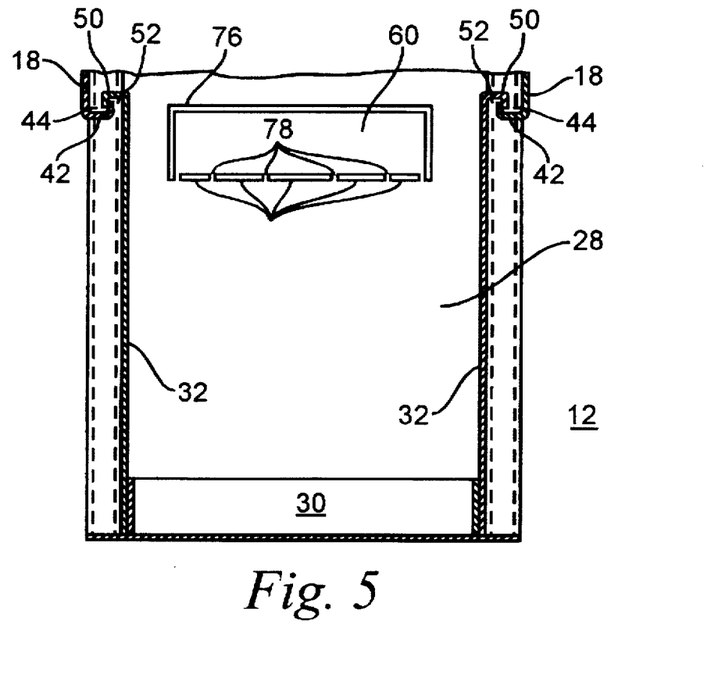
FIG. 5 illustrates a cross-sectional view of the high voltage compartment shown in FIG. 3 taken along a line 5—5 of FIG. 1.

As shown in FIGS. 3–5, a novel flange system is provided whereby the high voltage compartment 12 is defined by two symmetrical side walls or panels 28, a floor panel 30, the roof panel 18 (shown in FIG. 1) and a pair of identical removable doors 32. A U-shaped channel 38 is defined at each end portion 34 of the side walls 28 by means of a L-shaped flange portion 36 formed by successive perpendicular bends of the ends 34 of the side walls 28.

The bottom portions of the side walls 28 are secured to the floor 30 with bolts and the top portions of the side walls 28 are coupled to each other with a pair of tie bars 40. One of the tie bars 40 is bolted or welded to the end portions 34 in the front of the high voltage compartment 12 and the other tie bar 40 is bolted or welded to the end portions 34 in the rear of the high voltage compartment 12. Each of the tie bars 40 have a L-shaped flange 42 formed thereon which defines a U-shaped channel 44.

Each one of the doors 32 is symmetrical in shape having a L-shaped flange 46 formed on each side by two consecutive substantially perpendicular bends in the sides of the door 32. The L-shaped flanges 46 define U-shaped channels 48 which cooperate with the L-shaped flange portion 36 on the end portions 34 so that the doors 32 may be installed on the high voltage compartment 12. A U-shaped flange 50 extends from the top portion of the door 32. The U-shaped flange 50 which is formed by two consecutive substantially perpendicular bends at the top of the doors 32 defines a U-shaped channel 52. The doors 32 are inserted into the high voltage compartment 12 in the direction of direction arrows 54 (FIG. 3). After the doors 32 are installed on the high voltage compartment 12, the flanges 50 on the doors 32 overhang the flanges 42 on the tie bars 40 to secure the doors 32 at their top portions and the flanges 36 on the end portions 34 are disposed in the channels 48 defined by the flanges 46 on the doors 32. The bottom portions of the doors 32 are secured to flanges 56 on the floor 30 with bolts or screws (not shown) threaded through apertures 58 in the doors 32 and the flanges 56.

The channels and flanges cooperate with each other to define the unique flange system that provides a distinctive advantage when an electrical arcing fault occurs within the high voltage compartment 12. When an electrical fault occurs the side walls 28 expand outwardly to accommodate the pressure that has built up in the high voltage compartment 12. The U-shaped channel 48 allows the flange 36 on the side wall 28 to expand until it engages the flange 46 on the door. The flange 42 on the tie bar 40 expands outwardly until it engages the flange 50 on the door during the electrical fault. This engagement prevents the side walls and doors from separating from each other. Additionally, this engagement forms a seal which prevents the arc gasses from being expelled from the high voltage compartment 12.

The cooperation between the flanges and the channels defines the unique flange system which eliminates the problems of conventional enclosures by preventing the side walls and the doors from separating from each other thereby providing the advantage of eliminating the need for several fasteners, to hold the side walls and doors together. By eliminating the need for as many fasteners the flange system allows the enclosure components, such as the side walls and doors, to be made of thinner material which are cheaper to manufacture. The thinner material is more flexible than the heavier material used in the prior art thereby allowing the enclosure components to bend and absorb some of the pressure created during the circuit breaker interruption. The cooperation between the flanges and channels eliminates the need for gaskets to prevent the arc gasses from escaping the enclosure at undesired locations. Furthermore, the cooperation between the flanges and channels prevent external elements from entering the high voltage compartment.

Some conventional circuit breaker enclosures utilize vents to expel the hot arc gasses and pressure from their high voltage compartments during an electrical fault. However, these vents allow external weather conditions, such as rain and snow, to enter the high voltage compartment.

FIGS. 3–7 illustrate a unique weatherproof venting system which controllably directs hot arc gasses out of the high voltage compartment 12 when a fault occurs and vents hot air out of the high voltage compartment 12 during normal operation. The venting system includes a vent panel 60 in each of the side walls 28, a vent housing 61 secured to each of the side walls 28 disposed around the vent panel 60, and vent plates 62 covering apertures 64 (FIGS. 6 & 7) in the floor 30.

Figure 6:
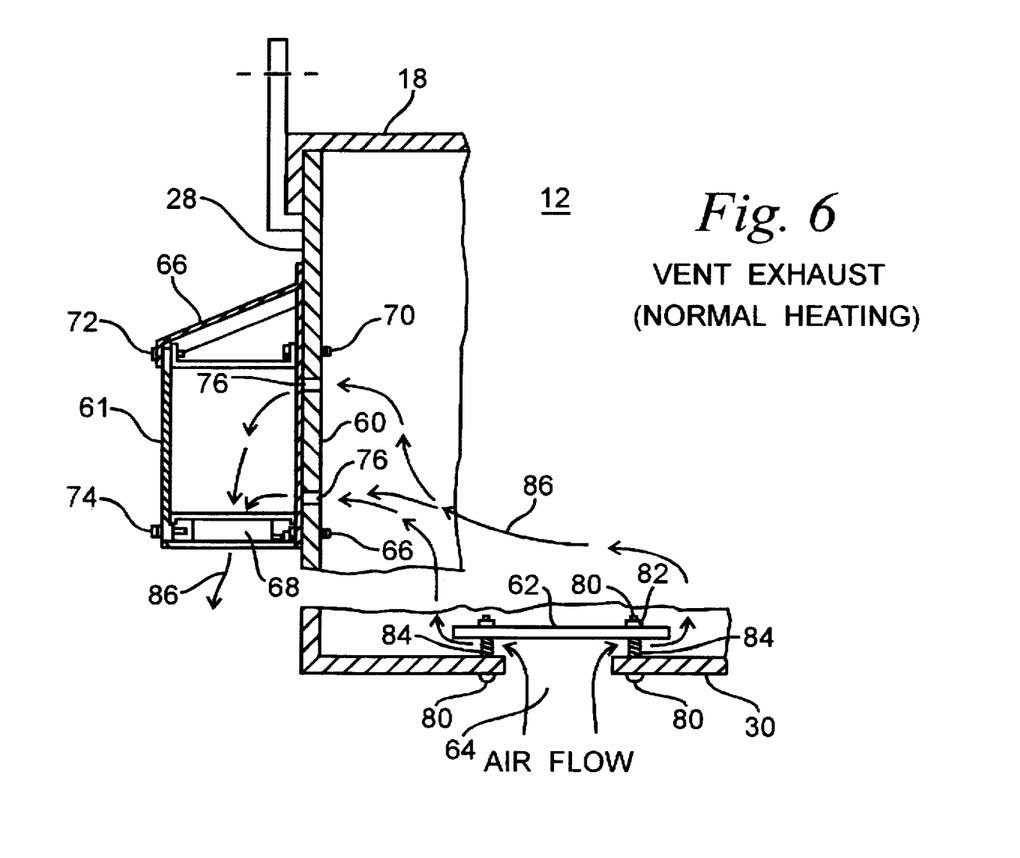
FIG. 6 illustrates a partial cross-sectional view of the circuit breaker enclosure in FIG. 2 taken along a line 6—6, and showing a gas vent with its cover in a "closed" position.
Figure 7:
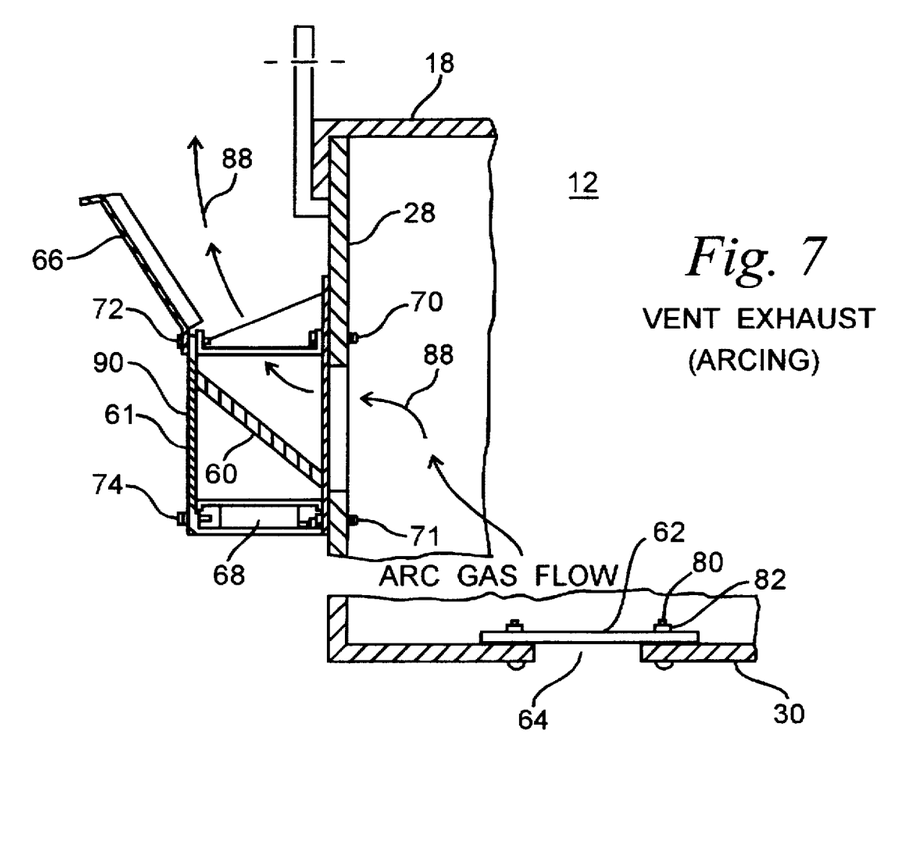
FIG. 7 illustrates a partial cross-sectional view of the circuit breaker enclosure similar to that in FIG. 6, except with the vent cover in a "open" position.

The vent housing 61 being made of metal has three sides and is secured to the side walls 28 using conventional bolts 70, 71. The combination of the vent housing 61 and the side wall forms a hollow, rectangular shaped box. A cover 66 is secured to the vent housing 61 with several rivets 72. The cover 66 is made of a thin flexible metal material so that it is easily folded over. The cover 66 is bent over until it rests against the side wall 28 thusly preventing environmental elements, such as rain and snow, from entering the high voltage compartment 12 through the vent housing 61 thereby allowing the enclosure 10 to be installed in an outside environment. One end of an air filter 68 is secured to the bottom portion of the vent housing 61 with a conventional bolt 74 and the other end is secured to the side wall with one of the same bolts 71 that secures the vent housing 61 to the side wall. The air filter 68 filters the air that exits the high voltage compartment 12 while the circuit breaker is conducting current normally.

FIGS. 3 and 5 show the side walls 28 with the vent housing 61 removed therefrom. As shown, the vent panel 60 is a section of each of the side walls 28 which has slots 76 cut out substantially therearound. Small portions of material 78 disposed at the bottom of the vent panel 60 secure the vent panel 60 to the side wall. The small portions of material 78 are flexible to allow the vent panel 60 to be bent over.

FIGS. 6 and 7 show one of the vent plates 62 secured to the floor 30 of the high voltage compartment 12 with bolts 80 and nuts 82. A compression spring 84 biases the vent plates 62 away from the floor 30.

Turning now to FIG. 6, the normal air flow through the high voltage compartment 12 will now be described. As shown by direction arrows 86, hot air is directed from the low voltage compartment 14 through the apertures 64 and into the high voltage compartment 12. The air is then directed out of the high voltage compartment 12 through the slots 76, into the vent housing 61, through the air filter 68 and out the bottom of the vent housing 61.

Turning now to FIG. 7, the arc gas flow, represented by direction arrows 88, during the electrical arcing fault within the high voltage compartment 12 will now be described. During the electrical arcing fault, the shock wave generated from the arc and the pressure generated from the arc gasses forces the vent plates 62 downwardly to cover the apertures 64 thereby sealing the apertures 64 closed and preventing the arc gasses from entering the low voltage compartment 14. The pressure shock wave forces the vent panel 60 outwardly until it engages a side wall 90 of the vent housing 61 thereby preventing the arc gasses from flowing out the bottom of the vent housing 61. The pressure of the arc gasses causes the vent cover 66 to blow open thereby allowing the arc gasses to escape out the top of the vent housing 61. Venting the arc gasses out the top of the vents is advantageous because the gasses are then directed away from equipment and individuals which may be located adjacent to the enclosure.

While there have been shown and described what are at present considered the preferred embodiments of the invention, it will be obvious to those skilled in the art that various changes and modifications may be made therein without departing from the scope of the invention as defined by the appended claims. For example, while two removable doors have been shown, only one door is required to be removable while the other door could be replaced with a permanent wall or panel. Additionally, only one gas vent is required, provided that it sufficiently expels the arc gasses so as to adequately reduce the pressure in the high voltage compartment during an electrical fault.

What is claimed is:

1. An enclosure for enclosing a circuit breaker therein, said enclosure comprising:

a plurality of walls enclosing the circuit breaker therein;

a flange system disposed on said plurality of walls for interlocking said walls together thereby preventing said walls from separating from each other during an electrical fault within said enclosure, said flange system having flanges that interlock with corresponding channels.

2. An enclosure according to claim 1, wherein said flange system further providing a seal thereby preventing arc gasses, which are generated during the electrical fault, from substantially escaping said enclosure.

3. An enclosure according to claim 1, wherein said flange system including:

an L-shaped flange portion disposed on each edge of each of said walls;

and a U-shaped channel defined by said L-shaped flange for accepting a corresponding one of said L-shaped flange portions of a corresponding one of said plurality of walls;

whereby said U-shaped channel of one of said walls accommodates said L-shaped flange of an another one of said plurality of walls.

4. An enclosure according to claim 1, further including a venting system having a vent cover capable of opening outwardly to permit escape of built up gasses but remaining closed otherwise in order to prevent an ingress of external elements.

5. An enclosure for enclosing a circuit breaker therein, said enclosure comprising:

a plurality of walls;

a floor panel coupled to said plurality of walls;

a roof panel coupled to said plurality of walls;

a venting system having a vent cover capable of opening outwardly to permit escape of built up gasses but remaining closed otherwise in order to prevent ingress of external elements; and a flange system disposed on said plurality of walls for interlocking said walls together thereby preventing said walls from separating from each other during an electrical fault within said enclosure, said flange system having flanges that interlock with corresponding channels.

6. An enclosure according to claim 5, wherein said flange system including:

an L-shaped flange portion disposed on each edge of each of said wall;

a U-shaped channel defined by said L-shaped flange for accepting a corresponding one of said L-shaped flange portions of a corresponding one of said walls;

whereby said U-shaped channel of one of said walls accommodates said L-shaped flange of another of said walls.

7. An enclosure according to claim 5, wherein said venting system further comprising:

a vent panel disposed in at least one of said plurality of walls adapted to be blown outwardly upon the electrical fault thereby deflecting the gasses upwardly;

a housing disposed around said vent panel; and a cover disposed on said box, said cover adapted to be blown upwardly upon the electrical fault thereby allowing the gasses to escape the enclosure.

8. An enclosure for enclosing a circuit breaker therein, said enclosure comprising:

a plurality of walls enclosing the circuit breaker therein;

a flange system disposed on said plurality of walls for interlocking said walls together thereby preventing said walls from separating from each other during an electrical fault, said flange system further providing a seal for preventing hot arc gasses, which are generated during the electrical fault, from escaping the enclosure at undesired locations; and a weatherproof vent disposed on at least one of said walls for expelling the hot arc gasses and pressure generated during the electrical fault from said enclosure, said vent prohibits environmental conditions, such as rain and snow, from entering said enclosure.

9. An enclosure according to claim 8, wherein said vent further having a vent cover capable of opening outwardly to permit escape of a build up of said but remaining closed otherwise in order to prevent ingress of the environmental conditions.

10. An enclosure for enclosing a circuit breaker therein, said enclosure comprising:

a plurality of walls enclosing the circuit breaker therein; and a flange system disposed on said plurality of walls for interlocking said walls together thereby preventing said walls from separating from each other during an electrical fault within said enclosure;

wherein said flange system providing a seal thereby preventing arc gasses, which are generated during the electrical fault, substantially escaping said enclosure.

11. An enclosure according to claim 10, wherein said flange system including:

an L-shaped flange portion disposed on each edge of each of said walls, and a U-shaped channel defined by said L-shaped flange for accepting a corresponding one of said L-shaped flange portion of a corresponding one of said walls;

whereby a U-shaped channel of one of said walls accommodates said L-shaped flange of another of said walls.

12. An enclosure according to claim 10, further including a venting system having a vent cover capable of opening outwardly to permit escape of built up gasses but remaining closed otherwise in order to prevent an ingress of external elements.

13. An enclosure for enclosing a circuit breaker therein, said enclosure comprising:

a plurality of walls;

a floor panel coupled to said plurality of walls;

a roof panel coupled to said plurality of walls; and a venting system having a vent cover capable of opening outwardly to permit escape of built up gasses but remaining closed otherwise in order to prevent an ingress of external elements; and a flange system disposed on said plurality of walls for interlocking said walls together thereby preventing said walls from separating from each other during an electrical fault within said enclosure, said flange system comprising:

an L-shaped flange portion disposed on each edge of each of said walls; and a U-shaped channel defined by said L-shaped flange for accepting a corresponding one of said L-shaped flange portions of a corresponding one of said walls;

whereby said U-shaped channel of one of said walls accommodates said L-shaped flange of another of said walls.

14. An enclosure according to claim 13, wherein said venting system further comprises:

a vent panel disposed in at least one of said plurality of walls adapted to be blown outwardly upon the electrical fault thereby deflecting the gasses upwardly;

a housing disposed around said vent panel; and a cover disposed on said housing, said cover adapted to be blown upwardly upon the electrical fault thereby allowing the gasses to escape the enclosure.

* * * * *